United States Patent [19]

Kaneko

[11] Patent Number: 5,287,502
[45] Date of Patent: Feb. 15, 1994

[54] COMPUTER SYSTEM FOR EXECUTING APPLICATION PROGRAMS BY A COMBINATION OF PICTURE SYMBOLS

[75] Inventor: Satomi Kaneko, Tokyo, Japan

[73] Assignee: Kabushiki Kaisha Toshiba, Kanagawa, Japan

[21] Appl. No.: 757,801

[22] Filed: Sep. 11, 1991

[30] Foreign Application Priority Data

Sep. 12, 1990 [JP] Japan ................ 2-241707

[51] Int. Cl.$^5$ .......................................... G06F 15/40
[52] U.S. Cl. ........................... 395/600; 364/DIG. 1; 364/282.1; 364/283.4; 364/286; 364/283.3
[58] Field of Search ......................................... 395/650

[56] References Cited

U.S. PATENT DOCUMENTS 4,723,209  2/1988  Hernandez et al. ................ 364/300

FOREIGN PATENT DOCUMENTS

92/15934  9/1992  PCT Int'l Appl. .

OTHER PUBLICATIONS

MacIntosh System Software User's Guide Version 6.0 1988, pp. 39, 85, 86, 87, 93, 111, 112.
Busch, David D. Secrets of MacPaint, McWrite, and MacDraw, 1986.
George F. Luger and William A. Stubblefield, Artificial Intelligence and the Design of Expert Systems, 1989, pp. 293-296.
Griggs, "A Visual Agent Approach for Modeling Organization," Proceedings of the 23rd Annual Hawaii International Conference on System Sciences, *IEEE Comput. Soc. Press*, vol. 3/4, pp. 363-372, Jan. 2-5, 1990.
AIXwindows for PS/2 Configuration Guide, First Edition, IBM SC23-2280-00, pp. 1-1, 9-10 (Part 1), Mar. 1990.

*Primary Examiner*—Gareth D. Shaw
*Assistant Examiner*—M. Rickey
*Attorney, Agent, or Firm*—Finnegan, Henderson, Farabow, Garrett & Dunner

[57] ABSTRACT

A method of obtaining a desired function from a computer system by selecting one or more pictorial symbols displayed on a display screen is disclosed. The method comprises the steps of providing a plurality of attributes to at least part of the plurality of pictorial symbols, inferring by using a predetermined rule in accordance with the attributes when one or more of the plurality of pictorial symbols is selected, and obtaining a function of the computer system in accordance with the inferred result.

6 Claims, 4 Drawing Sheets

FIG. 3

| EXAMPLE OF CELECTION OF PICTRORIAL SYMBOLS | KNOWLEDGE TO BE USED | | |
| --- | --- | --- | --- |
| | PICTORIAL SYMBOL ATTRIBUTE KNOWLEDGE | FUNCTION-OBTAINING KNOWLEDGE | RESTRICTION KNOWLEDGE |
| DOCUMENT | A 5 | F 7 | |
| PENCIL / PAPER | A 1 , A 5 | F 1 , F 7 | R 1 |
| PENCIL/STOREBOX | A 1 , A 4 | F 6 | |
| CALCULATOR/ · PAPER | A 5 , A 7 | F 7 , F 9 | R 1 |

COMPUTER SYSTEM FOR EXECUTING APPLICATION PROGRAMS BY A COMBINATION OF PICTURE SYMBOLS

BACKGROUND OF THE INVENTION

1. Field of the Invention

The present invention relates to a method of obtaining functions by using pictorial symbols which symbolize functions and so forth of a computer system and for linking mental images of a user with functions and so forth of the computer system, thereby improving the usability of the system.

2. Description of the Related Art

In conventional computer systems, a user operates particular keys on the keyboard in a particular sequence so as to obtain a particular function therefrom. Thus, to obtain a particular function, the user should carefully and thoroughly read operation manuals with respect to the computer system and memorize the key operations thereof.

To reduce the burden to the user, a method using pictorial symbols for example icons which symbolize functions and so forth of the computer system has been used. In this method, icons which symbolize functions and so forth of the computer system are displayed on a display screen thereof. The user clicks one of the icons in accordance with a desired function by using a mouse or the like. With this method, the user can link mental images associated with icons to functions and so forth of the computer system and thereby he or she can readily operate the system. Thus, it is not necessary for the user to thoroughly read the operation manuals and memorize the key operations.

However, in the conventional method of obtaining functions by using pictorial symbols, the functions obtained with the pictorial symbols have been uniquely determined. Thus, pictorial symbols for all functions that the computer system provides are required. In other words, in a small computer system with a small number of functions, no problem occurs. On the other hand, in a large computer system with a large number of functions, a large number of pictorial symbols are required. In other words, since the user should memorize all the pictorial symbols and the corresponding functions, they burden him or her with the operations of the computer system and thereby disadvantageously affecting the human interface with the computer system.

SUMMARY OF THE INVENTION

Therefore, an object of the present invention is to provide a method of obtaining functions by using pictorial symbols, where the method has higher operability than the related art.

Another object of the present invention is to provide a method of obtaining functions by using pictorial symbols as a human interface, the method being applicable with high flexibility to a large computer system with a large number of functions.

The method according to the present invention is a method of obtaining a desired function from a computer system by selecting one or more pictorial symbols from a plurality of pictorial symbols displayed on a display, the method comprising the steps of providing a plurality of attributes as a knowledge base to at least part of the plurality of pictorial symbols, inferring by using a predetermined rule in accordance with the plurality of attributes of the knowledge base when one or more of the plurality of pictorial symbols is selected, and obtaining an application function of the computer system in accordance with the inferred result.

According to the present invention, since at least part of the pictorial symbols have a plurality of attributes, a large number of functions can be represented with a relatively small number of pictorial symbols. In addition, since the knowledge base has, for example, an object attribute and a function attribute for each pictorial symbol, it is possible to closely associate mental images of the user as pictorial symbols with functions of the computer system. Thus, according to the present invention, the operability can be improved in comparison with the related art. In addition, the method according to the present invention can be flexibly applied to a large computer system with a large number of functions.

BRIEF DESCRIPTION OF DRAWINGS

FIG. 3 is a table showing examples of knowledge in pictorial symbol attribute knowledge, function-obtaining knowledge, and restriction knowledge applied when one or a plurality of pictorial symbols is selected.

DESCRIPTION OF PREFERRED EMBODIMENTS

Now, with reference to the accompanying drawings, an embodiment of the present invention will be described.

Figure 1:
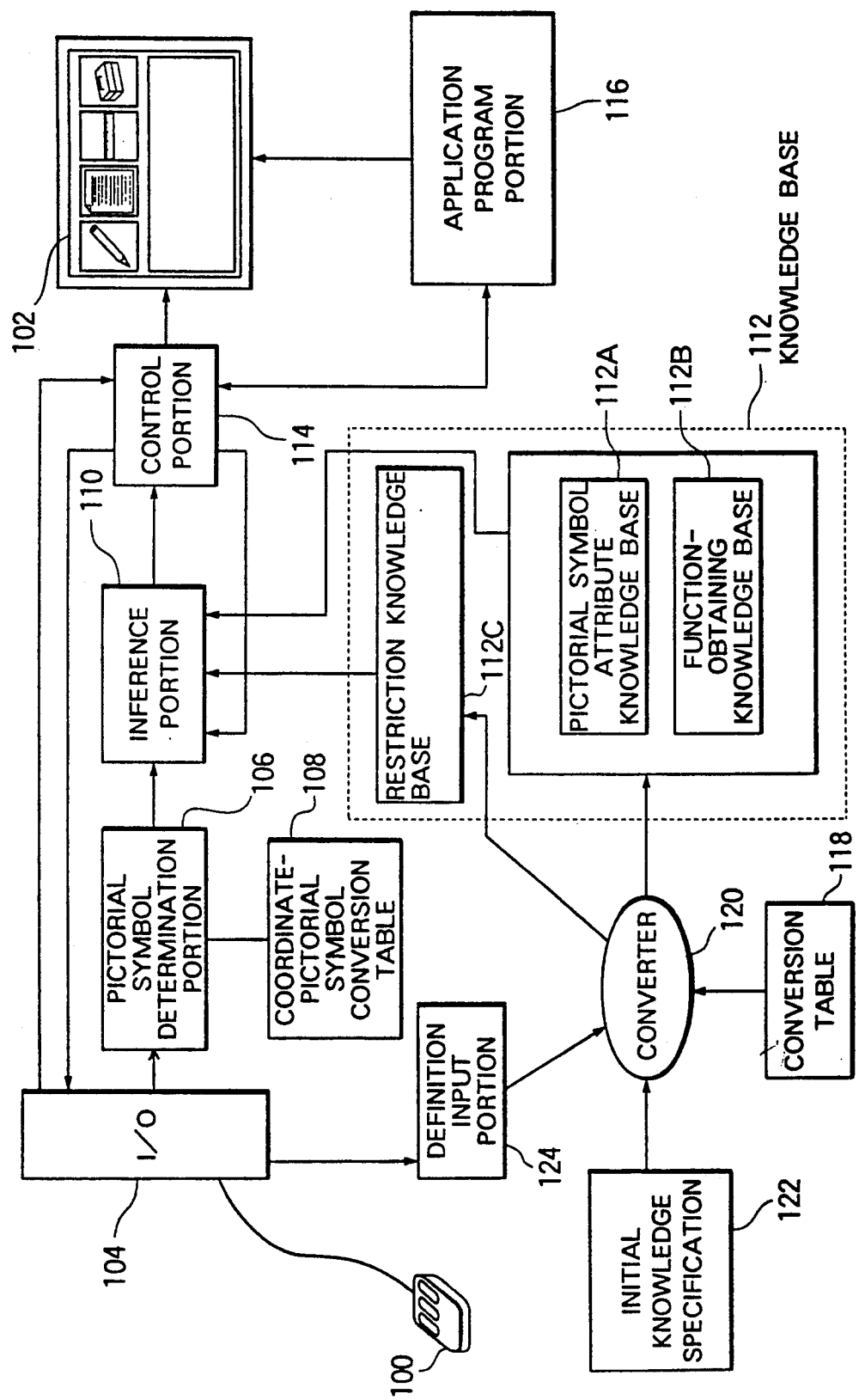
FIG. 1 is a block diagram showing a construction of a computer system embodying a method of obtaining functions by using pictorial symbols according to the present invention.

FIG. 1 is a block diagram showing a construction of a computer system embodying a method of obtaining functions by using pictorial symbols according to the present invention.

In the figure, reference numeral 100 denotes a mouse for selecting and inputting a pictorial symbol or an icon. Reference numeral 102 denotes a display unit which displays a screen for displaying pictorial symbols and a screen for displaying execution of a function (an application program).

Information with respect to a pictorial symbol selected by the mouse 100 is input to a pictorial symbol determination portion 106 through in I/O port 104 which is an input portion. Practically, when the user operates the mouse 100, a cursor is placed at a desired pictorial symbol on the display unit 102. When the user clicks the desired pictorial symbol, information with respect to the X-Y coordinates on the screen of the display unit 102 is input to the pictorial symbol determination portion 106. In this case, the user can select one or a plurality of pictorial symbols.

The pictorial symbol determination portion 106 references coordinates—pictorial symbol conversion table 108, determines the selected pictorial symbol from the information with respect to the coordinates being input, and sends the information with respect to the selected pictorial symbol to an inference portion 110.

The pictorial symbol knowledge base 112 is composed of a pictorial symbol attribute knowledge base 112A and a function-obtaining knowledge base 112B.

The pictorial symbol attribute knowledge base 112A has for example object attribute data and a function attribute data according to pictorial symbols. The object attributes has a noun property which is associated with a corresponding pictorial symbol. Examples of object attributes are tool, container, paper, and so forth, as will be described later in more detail.

On the other hand, a function attribute has a verbal property which is associated with a corresponding pictorial symbol. Examples of function attributes are edit, erase, store, draw a diagram, display itself, and so forth, will also be described later in more detail.

The function-obtaining knowledge base 112B stores knowledge with respect to a relation between each application program provided by an application program portion 116 and a condition necessary for the execution thereof (hereinafter called function-obtaining knowledge) in a knowledge representing format such as if— then rules. The function-obtaining knowledge stored in the function-obtaining knowledge base 112B is specified in accordance with the above mentioned pictorial symbol attributes knowledge which the selected pictorial symbol has and in accordance with a particular rule predetermined in an inference portion 110. In accordance with the specified function-obtaining knowledge represents a relation between an execution condition of an application program (a pictorial symbol attribute knowledge) and the application program to be executed, the application program to be executed is determined.

In other words, when one or more of pictorial symbols (icons) are specified, the function-obtaining knowledge, which is in the function-obtaining knowledge base 112B and which describes the object attributes and the function attributes of the pictorial symbol attribute knowledge base 112A that the specified pictorial symbols have is specified, a program in the application program portion 116 is specified to be executed by being inferred with the specific function-obtaining knowledge.

The inference portion 110 infers in accordance with the information with respect to the selected pictorial symbol such as a pictorial symbol attribute knowledge and a function-obtaining knowledge with respect to the pictorial symbol stored in a knowledge base 112 so as to specify a function that the user wants to obtain. Thereafter, the inference portion 110 sends the inferred result to a control portion 114.

The control portion 114 commands an application program portion 116 to execute an application program necessary for accomplishing the specified function in accordance with the inferred result. The application program portion 116 executes the application program in accordance with the command, thereby obtaining the function that the user specified.

The knowledge base 112 stores an initial knowledge specification 122, which is input through a converter 120 having a conversion table 118. The initial knowledge specification 122 is composed of the pictorial symbol attribute knowledge base 112A, the function-obtaining knowledge base 112B, and a restriction knowledge base 112C.

Figure 2:
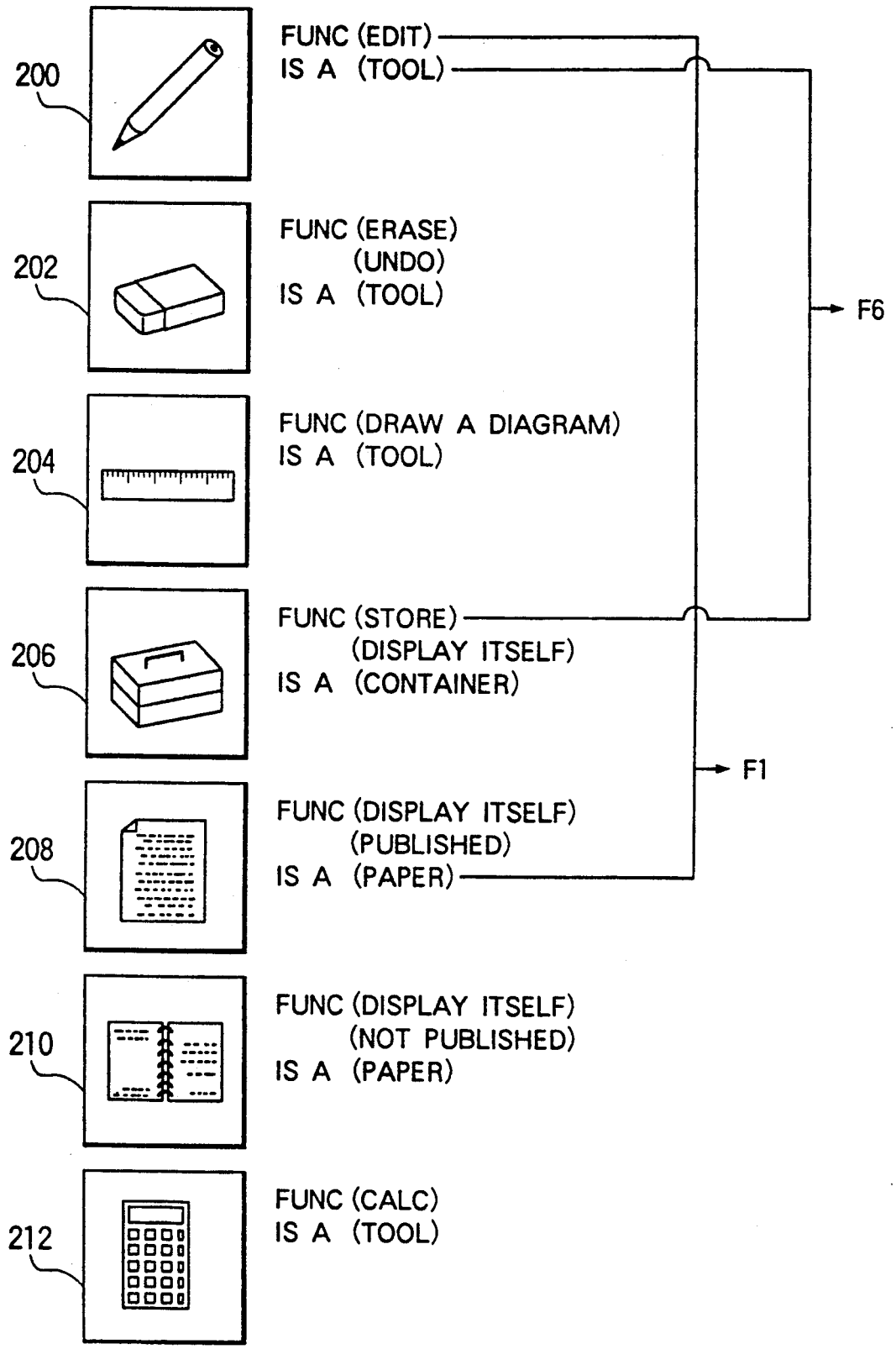
FIG. 2 is a schematic showing relations between attributes that pictorial symbols have and function-obtaining knowledge.

The pictorial symbol attribute knowledge base 112A represents what attribute each pictorial symbol has. Each pictorial symbol has one or a plurality of attributes. For example, as shown in FIG. 2, a pencil pictorial symbol 200 has two attribute values which are (edit) as a function attribute and (tool) as an object attribute. An eraser pictorial symbol 202 has three attribute values which are (erase) and (undo) as function attributes and (tool) as an object attribute. A ruler pictorial symbol 204 has two attribute values which are (draw a diagram) as a function attribute and (tool) as an object attribute. A storebox pictorial symbol 206 has three attribute values which are (store) and (display itself) as function attributes and (container) as an object attribute. A document pictorial symbol 208 has three attribute values which are (display itself) and (published) as function attributes and (paper) as an object attribute. A notebook pictorial symbol 210 has three attribute values which are (display itself) and (not published) as function attributes and (paper) as an object attribute. A calculator pictorial symbol 212 has two attribute values which are (calculate) as a function attribute and (tool) as an object attribute.

The pictorial symbol attribute knowledge are illustratively represented by using FRL (Frame Representation Language) as follows.

| (pencil | | | | |
| | (isa | (value | (tool))) | |
| | (function | (value | (edit)))) | A1 |
| (eraser | | | | |
| | (isa | (value | (tool))) | |
| | (function | (value | (erase)(undo)))) | A2 |
| (ruler | | | | |
| | (isa | (value | (tool))) | |
| | (function | (value | (draw_a_diagram)))) | A3 |
| (container | | | | |
| | (isa | (value | (container))) | |
| | (function | (value | (store)(display_itself)))) | A4 |
| (paper | | | | |
| | (isa | (value | (paper))) | |
| | (function | (value | (display_itself)))) | |
| | (function | (value | (published))) | A5 |
| (note book | | | | |
| | (isa | (value | (paper))) | |
| | (function | (value | (display_itself)))) | |
| | (function | (value | (not_published))) | A6 |
| (calculator | | | | |
| | (isa | (value | (tool))) | |
| | (function | (value | (calc)))) | A7 |

In addition, the function-obtaining knowledge base 112B is represented as rules which describe application programs to be executed in accordance with object attributes and function attributes of the selected pictorial symbols mentioned above or in accordance with relations among these attributes. For example, the function-obtaining knowledge are represented by the production rules as follows.

| { | (paper  instance <file_name>) | | |
| | ( function edit) | | |
| | → | | |
| | edit <file name>; | } | F1 |
| { | (paper  instance <file_name>) | | |
| | ( function erase) | | |
| | → | | |
| | erase <file_name>; | } | F2 |
| { | (paper  instance <file_name>) | | |
| | ( function draw_a_diagram) | | |
| | → | | |
| | draw_a_diagram <file_name>; | } | F3 |
| { | ( function undo) | | |

-continued

```
          →
          undo;                                  }    F4
    {   (paper  instance <file_name>)
        (  function store)
          →
          save <file_name>;                      }    F5
    {   (tool  instance <appli_name>)
        (  function store)
          →
          quit <appli_name>;                     }    F6
    {   (paper  function display_itself
                    instance <file_name>)
          →
          type <file_name>;                      }    F7
    {   (container  function display_itself
                    instance <directory_name>)
          →
          list <directory_name>;                 }    F8
    {   (paper  instance <file_name>)
        (  function calcu)
          →
          (calcu <file_name>);                   }    F9
```

The restriction knowledge base 112C is a knowledge base of restrictions to be imposed so as to determine a function to be preferentially obtained when a plurality of function-obtaining rules conflict with each other as the inferred results obtained by using the pictorial symbol attribute knowledge base 112A and the function-obtaining knowledge base 112B. The restriction knowledge are, for example, illustratively represented by the production rules as follows.

```
    {   (selected   icon_number <n>)
        (result   icon_number <1> <= <n>)
                  function <func_A>
                  application <appli_X>)
        (result   icon_number <m> <= <n>
                  function <func_B>
                  application <appli_Y>)
          →
          kill <appli_Y>;
          execute <appli_X>;                     R1
    }
    {   (select   icon_number <n>)
        (select_order   <a> <icon_A>
                        <b> <icon_B>)
        (<a> <= <b>)
        (<icon_A>   function <func_A>)
        (<icon_B>   function <func_B>)
        (result   icon_number <1> == <n>
                  used_func <func_A>
                  application appli_X>)
        (result   icon_number <m> == <n>
                  used_func <func_B>
                  application <appli_Y>)
          →
          kill <appli_Y>;
          execute <appli_X>;
    }                                            R2
```

The restriction rule R1 is illustrated as follows.

For example three pictorial symbols A, B, and C are selected. When all the pictorial symbols A, B, C are considered, a function-obtaining rule is satisfied; when any two pictorial symbols (for example, B and C) are selected, a different function-obtaining rule is satisfied. In this case, R1 determines to execute the function in accordance with the case where all the pictorial symbols A, B, and C are selected. In other words, with respect to the restriction rule R1, in the case where both functions of X and Y are able to be executed because two function-obtaining rules of function-obtaining knowledge base 112B are satisfied, and when the number of pictorial symbols to be considered in the function-obtaining rule with respect to the function X is larger than that with respect to the function Y, the function X is preferentially used to be executed.

Thus, even if two function-obtaining rules are applicable and each of them obtains a different function to be executed, as mentioned above, by the restriction rule for preferentially using a function in accordance with the function-obtaining rule considering more pictorial symbols than another, the function not to be executed is restricted and the function to be executed is determined to be used. The function-obtaining knowledge which obtains the function Y is restricted and only the function obtaining knowledge which obtains the function X is used.

On the other hand, with respect to the restriction rule R2, when different combinations of function attributes and object attributes satisfy two of different function-obtaining rules in a particular combination of pictorial symbols, a function in accordance with a function attribute of a pictorial symbol which is first selected is obtained.

Then, the method of obtaining functions by using the pictorial symbol attribute knowledge base 112A, the function-obtaining knowledge base 112B, and the restriction knowledge base 112C will be practically described in the following.

EXAMPLE 1

When the user selects the pencil and the paper as the pictorial symbols by operating for example the mouse 100, the pictorial symbol attribute knowledge A1 and A5 in accordance with these pictorial symbols are obtained as shown in FIG. 3. Thereafter, the inference portion 110 references the function attributes and the object attributes, infers in accordance with these pictorial symbol attribute knowledge A1 and A5, and determines that the function-obtaining rules F1 and F7 are satisfied. In this case, the restriction rule R1 is applied and thereby the function-obtaining rule F1 is selected (this case where the restriction knowledge base knowledged 112C is applied will be described in more detail in Example 3). The function that is described in the function-obtaining rule F1 is to "edit the file with the file name <file—name>." The inferred result is sent to the control portion 114. Thereafter, the control portion 114 commands the application program portion 116 to execute an application program for executing the specified function. Thereby, the application program portion 116 executes the application program which can "edit the file with the file name <file—name>" and obtains the function that the user desired.

In this case, as shown in FIG. 2, the function is obtained in accordance with the function attribute (edit) that the pencil pictorial symbol 200 has and the object attribute (paper) that the paper pictorial symbol 208 has.

EXAMPLE 2

When the pencil and the storebox are selected as the pictorial symbols, as shown in FIG. 3, the inference portion 110 infers by using the pictorial symbol attribute knowledge A1 and A4 in accordance with these pictorial symbols and determines that the function-obtaining rule F6 is satisfied. Thereafter, the function described in the function-obtaining rule F6 is obtained and thereby the application program for editing is stopped.

In this case, as shown in FIG. 2, the function is obtained in accordance with the object attribute (tool) that the pencil pictorial symbol 200 has and the function attribute (store) that the storebox pictorial symbol 206 has.

Thus, in the above mentioned two cases, although the user selected the pencil pictorial symbol 200, different functions are obtained in a combination of the function attribute and the object attribute that the pencil pictorial symbol 200 has and those that other pictorial symbol has.

Thus, when one pictorial symbol provides a plurality of attributes, even with the same pictorial symbol, a different function can be obtained in accordance with the type of pictorial symbol in combination therewith. Consequently, with a relatively small number of pictorial symbols, a large number of functions can be accomplished. Thus, the number of pictorial symbols to be memorized by the user can be reduced. In addition, since the contents of the functions can be metaphorically displayed, the user can deepen his or her understandings about the functions, thereby improving the operability.

EXAMPLE 3

Next, a case where the restriction knowledge base 112C is applied will be described. As shown in FIG. 3, when the calculator 212 and the paper 208 are selected as the pictorial symbols, the inference portion 110 infers by using the pictorial symbol attribute knowledge A5 and A7 in accordance with these pictorial symbols and determines that the function-obtaining rules F7 and F9 are satisfied.

Figure 4:
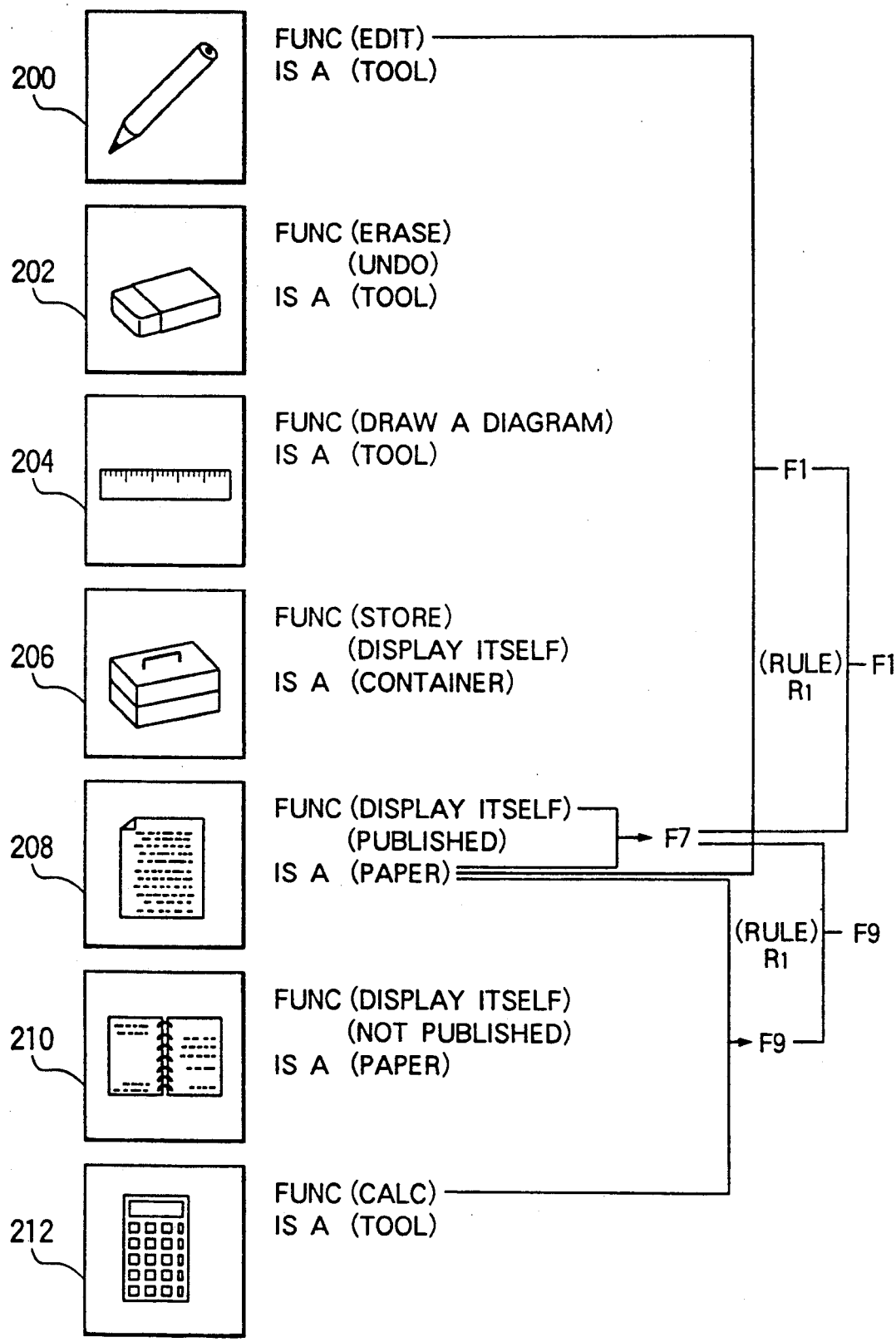
FIG. 4 is a schematic showing relations between attributes of pictorial symbols and the function-obtaining knowledge applied when each of these symbols is selected.

In this case, as shown in FIG. 4, the function-obtaining rule F7 is a rule which is satisfied only by the function attribute (display_itself) that only the paper pictorial symbol 208 has, while the function-obtaining rule F9 is a rule which is satisfied by the object attribute (paper) that the paper pictorial symbol 208 has and by the function attribute (calc) that the calculator pictorial symbol 212 has. When two function-obtaining rules conflict with each other and the number of pictorial symbols that are referenced as pictorial symbol attribute knowledge that are execution conditions of an application program differs between these rules, the restriction rule R1 is applied. In other words, in this case, the function-obtaining rule F9 that considers both the attributes of the paper pictorial symbol 208 and that of the calculator pictorial symbols 212 is used instead of the function-obtaining rule F7, which considers only the attributes of the paper pictorial symbol 208. Thus, in accordance with the function-obtaining rule F9, the application program which can "calculate the table with the file name <file—name>" is executed.

In addition, as an example where the restriction knowledge R1 is applied in FIG. 3, the pencil pictorial symbol 200 and the paper pictorial symbol 208 may be selected. In this case, with a combination of the function attribute (edit) that the pencil pictorial symbol 200 has and the object attribute (paper) that the document pictorial symbol 208 has, the function-obtaining rule F1 is satisfied. On the other hand, the function attribute (display_itself) that the document pictorial symbol 208 has satisfies the function-obtaining rule by itself. Like the above example, by applying the restriction knowledge R1, the function in accordance with the function-obtaining rule F1 considering more pictorial symbols than the other rule F7 is used. Thereby, the application program which can "edit the file with the file name <file_name>" is executed.

On the other hand, when only the paper is selected as the pictorial symbol, since the pictorial symbol attribute knowledge A5 satisfies the function-obtaining rule F7, a function is obtained in accordance with the function-obtaining rule F7. The case where the user selects a plurality of pictorial symbols and the case where he or she selects only one pictorial symbol can be distinguished, for example, by using a normal click and a double click of the mouse 100, respectively. In addition, such cases can be also distinguished by overlapping one pictorial symbol on another pictorial symbol and then using the double click of the mouse 100.

When a function-obtaining rule cannot be specified as the inferred result obtained from the inference portion 110, the result is sent to the control portion 114. Thereafter, the control portion 114 causes the display unit 102 to display a message describing that there is no function in accordance with the pictorial symbol being selected. In this case, the user selects another pictorial symbol(s) or adds new knowledge to the knowledge base 112 through the definition input portion 124 and the converter 120 so as to add a new rule for obtaining a function.

In the above description, as the inferred result by the inference portion 110 in accordance with the function-obtaining knowledge base 112B, when a plurality of application programs to be executed by the application program portion 116 have been applicable, the restriction knowledge base 112C functions as a knowledge base for specifying one from these application programs. However, when a combination of pictorial symbols selected by the user is improper, the restriction knowledge base 112C may also have a condition knowledge for stopping the inference operation by the inference portion 110. In this case, the information of the improper selection of the pictorial symbols is sent to the inference portion 110 through the pictorial symbol determination portion 106. Thereby, a condition knowledge determination portion (not shown in the figure) of the inference portion 110 stops the inference operation which uses the knowledge of the pictorial symbol attribute knowledge base 112A and the function-obtaining knowledge base 112B by using the condition knowledge stored in the restriction knowledge base 112C. The information which stops performing the inference operation and then stops obtaining the function from the pictorial symbol is sent from the inference portion 110 to the control portion 114. At that time, the control portion 114 transfers the information for stopping function-obtaining to the I/O port 104 and the display unit 102. Thereby, the window area of the display unit 102 prompts the user to retry to obtain a function with pictorial symbols. Accordingly, since the user sets the desired pictorial symbols for obtaining the function, the improper selection of pictorial symbols is removed.

At that time, when the user improperly selects pictorial symbol(s) with an expectation of executing a particular application program, it is preferable, from the viewpoint of the human interface, to permit this combination of the pictorial symbols and to obtain the application program expected by the user. To do this, besides the knowledge for specifying a function when there are a plurality of applicable functions and the knowledge for detecting an impropriety of selected pictorial symbol(s) and for stopping the obtaining of a function, the restriction knowledge 112C may have a learning knowledge for permitting the users to obtain the expected functions in their improper selections of pictorial symbols, by considering, for example, the frequency of each improper selection of pictorial symbols and the attribute knowledge of these pictorial symbols.

When the restriction knowledge base 112C is also provided with the learning knowledge mentioned above, besides a function in accordance with a selection of pictorial symbols defined in the initial knowledge specification 122 and a function in accordance with a selection of pictorial symbols newly defined by the user with the mouse 100, a function in accordance with a selection of pictorial symbols newly defined by the learning knowledge can be obtained.

When the user has difficulty in obtaining a function in accordance with a selection of pictorial symbols depending on the knowledge obtained as the learning result, he or she redefines the pictorial symbols to be selected by using the mouse 100 so as to remove the difficulty. Thus, the pictorial symbols defined by the user are stored in the pictorial symbol attribute knowledge base 112A and the function-obtaining knowledge base 112B and become a knowledge base that is inferred by the inference portion 110.

In addition, an obtained knowledge stored in the restriction knowledge base 112C with respect to a function which is obtained in a combination of pictorial symbols based on the learning knowledge may be moved to the pictorial symbol attribute knowledge base 112A and the function-obtaining knowledge base 112B through the control portion 114, the I/O port 104, the definition input portion 124, and the converter 120 unless the user redefines the knowledge. In this case, since the knowledge of the pictorial symbol knowledge base which are accessed by the inference portion 110 are newly added, development patterns for obtaining functions in selections of pictorial symbols are increased.

According to the present invention, since at least part of pictorial symbols have a plurality of attributes, a large number of functions can be represented with a relatively small number of pictorial symbols. In addition, since one pictorial symbol has attributes for example as an object and a function, it is possible to closely associate mental images that the user has with respect to pictorial symbols with functions of the computer system. Thus, according to the present invention, the operability can be improved in comparison with the related art. In addition, the method according to the present invention can be flexibly applied to a large computer system with a large number of functions.

Moreover, in the above mentioned embodiment, an example where a particular function was obtained by selecting one or a plurality of pictorial symbols obtained by clicking the mouse was described. However, even if one or a plurality of pictorial symbols is selected with a touch panel or the like, the present invention can be applied.

In the above mentioned embodiment, an example where function attributes and object attributes were used as attributes of pictorial symbols was described. However, it is possible to use either the function attributes or the object attributes and also to use other attributes.

Moreover, besides the above mentioned embodiment, the present invention can be applied to modifications thereof which are readily accomplished by those of ordinary skill in the art.

What is claimed is:

1. A computer system, comprising:
   application-program-storage means for storing application programs;
   attribute-storage means for storing attributes corresponding to pictorial symbols, ones of the pictorial symbols having more than one attribute and each attribute having one or more object attributes and one or more function attributes;
   rule-storage means for storing rules for selecting a one of the application programs to be executed in accordance with a relation between the stored attributes and a relation between one of the object attributes and one of the function attributes;
   display means for displaying the pictorial symbols;
   selection means for selecting one or more pictorial symbols from the pictorial symbols displayed on the display means;
   rule-selection means for specifying attributes corresponding to the one or more pictorial symbols selected by the selection means from among the attributes stored in the attribute-storage means, and for selecting the application program to be executed in accordance with the rules relating to the specified attributes; and
   application-program-execution means for reading the application program selected by the rule-selection means from the application-program-storage means and for executing the application program.

2. The computer system of claim 1, wherein the rule-selection means specifies the attributes corresponding to the one or more pictorial symbols selected by the selection means from among the attributes stored in the attribute-storage means, and selects the application program to be executed in accordance with the rules relating to the specified attributes.

3. The computer system of claim 2, further comprising rule-registration means for registering a new rule to the rule-storage means.

4. The computer system of claim 1, further comprising:
   application-program-selection-rule-storage means for storing a rule further specifying how to select one application program when the rule-selection means selects a plurality of application programs;
   wherein, when the rule-selection means selects a plurality of application programs, the rule-selection means further specifies how to select one application program.

5. The computer system of claim 4 wherein the rule-selection means specifies the attributes corresponding to the one or more pictorial symbols selected by the selection means from among the attributes stored in the storage means, and selects the application program to be executed in accordance with the rules relating to the specified attributes.

6. The computer system of claim 5, further comprising rule-registration means for registering a new rule to the rule-storage means.

* * * * *